(12) United States Patent
Backholm et al.

(10) Patent No.: US 10,201,035 B2
(45) Date of Patent: Feb. 5, 2019

(54) DYNAMIC ADJUSTMENT OF KEEP-ALIVE MESSAGES FOR EFFICIENT BATTERY USAGE IN A MOBILE NETWORK

(71) Applicant: Seven Networks, LLC, Marshall, TX (US)

(72) Inventors: Ari Backholm, Los Altos, CA (US); Mikko Tervahauta, San Francisco, CA (US); Seppo Salorinne, Helsinki (FI); Jukka Ahonen, Lahti (FI); Mikko Daavittila, Espoo (FI); Andrew Everitt, Cambridge (GB); Lauri Vuornos, Helsinki (FI)

(73) Assignee: Seven Networks, LLC, Marshall, TX (US)

( * ) Notice: Subject to any disclaimer, the term of this patent is extended or adjusted under 35 U.S.C. 154(b) by 0 days.

(21) Appl. No.: 16/046,946

(22) Filed: Jul. 26, 2018

(65) Prior Publication Data
US 2018/0359804 A1    Dec. 13, 2018

Related U.S. Application Data

(63) Continuation of application No. 15/883,436, filed on Jan. 30, 2018, now Pat. No. 10,045,393, which is a
(Continued)

(51) Int. Cl.
*G08C 17/00*    (2006.01)
*H04W 76/25*    (2018.01)
(Continued)

(52) U.S. Cl.
CPC ......... *H04W 76/25* (2018.02); *H04L 43/0811* (2013.01); *H04L 43/103* (2013.01);
(Continued)

(58) Field of Classification Search
CPC ............ H04W 52/02; H04W 52/0225; H04W 52/0251; H04L 29/08612; H04L 45/026; H04L 67/145
(Continued)

(56) References Cited

U.S. PATENT DOCUMENTS 5,881,055 A     3/1999  Kondo
7,406,087 B1 *  7/2008  Quach .................... H04L 47/10
                                                  370/389
(Continued)

FOREIGN PATENT DOCUMENTS

CN      105637919       6/2016
EP       2817941 A4    10/2015
(Continued)

OTHER PUBLICATIONS

USPTO, Non-Final Office Action in U.S. Appl. No. 15/787,376 dated Apr. 25, 2018.
(Continued)

*Primary Examiner* — Marcos Batista
(74) *Attorney, Agent, or Firm* — NK Patent Law

(57) ABSTRACT

A method for IP [=Internet Protocol] communication between a mobile terminal and its correspondent node in a mobile radio network. The method comprises establishing an IP connection between the mobile terminal and its correspondent node. After detecting a period of inactivity in the IP connection, keep-alive messages are sent via the IP connection at predetermined intervals, which are varied. The method comprises monitoring the lengths of several periods of inactivity at which the mobile radio network disconnects the IP connection.

20 Claims, 3 Drawing Sheets

Related U.S. Application Data continuation of application No. 15/281,704, filed on Sep. 30, 2016, now Pat. No. 9,883,548, which is a continuation of application No. 15/079,089, filed on Mar. 24, 2016, now Pat. No. 9,491,703, which is a continuation of application No. 14/662,161, filed on Mar. 18, 2015, now Pat. No. 9,485,732, which is a continuation of application No. 14/283,193, filed on May 20, 2014, now Pat. No. 9,007,976, which is a continuation of application No. 13/043,425, filed on Mar. 8, 2011, now Pat. No. 8,731,542, which is a continuation-in-part of application No. 12/853,119, filed on Aug. 9, 2010, now Pat. No. 8,285,200, which is a continuation of application No. 11/471,630, filed on Jun. 21, 2006, now Pat. No. 7,774,007.

(60) Provisional application No. 61/408,826, filed on Nov. 1, 2010, provisional application No. 60/707,170, filed on Aug. 11, 2005.

(51) Int. Cl.
| | | |
|---|---|---|
| *H04W 52/02* | (2009.01) | |
| *H04W 52/44* | (2009.01) | |
| *H04L 29/08* | (2006.01) | |
| *H04L 12/26* | (2006.01) | |
| *H04W 80/04* | (2009.01) | |
| *H04W 72/12* | (2009.01) | |
| *H04W 48/08* | (2009.01) | |
| *H04W 24/00* | (2009.01) | |

(52) U.S. Cl.
CPC ............ *H04L 67/14* (2013.01); *H04L 67/145* (2013.01); *H04W 52/0212* (2013.01); *H04W 52/0229* (2013.01); *H04W 52/44* (2013.01); *H04W 24/00* (2013.01); *H04W 48/08* (2013.01); *H04W 72/12* (2013.01); *H04W 80/04* (2013.01); *Y02B 70/30* (2013.01); *Y02D 70/00* (2018.01); *Y02D 70/124* (2018.01); *Y02D 70/1224* (2018.01); *Y02D 70/1262* (2018.01); *Y02D 70/146* (2018.01)

(58) Field of Classification Search
USPC ...................................... 370/311; 455/9, 466
See application file for complete search history.

(56) References Cited

U.S. PATENT DOCUMENTS

| | | | |
|---|---|---|---|
| 7,460,556 | B2 | 12/2008 | Duggirala et al. |
| 7,634,558 | B1 | 12/2009 | Mangal et al. |
| 7,643,818 | B2 | 1/2010 | Backholm et al. |
| 7,769,395 | B2 | 8/2010 | Fiatal et al. |
| 7,853,563 | B2 | 12/2010 | Alvarado et al. |
| 7,917,468 | B2 | 3/2011 | Ariel et al. |
| 8,069,166 | B2 | 11/2011 | Alvarado et al. |
| 8,385,313 | B2 | 2/2013 | Andreoli-Fang et al. |
| 8,468,126 | B2 | 6/2013 | van Gent et al. |
| 8,787,947 | B2 | 7/2014 | Backholm et al. |
| 8,805,425 | B2 | 8/2014 | Fiatal |
| 9,002,828 | B2 | 4/2015 | Fiatal |
| 9,433,030 | B2 | 8/2016 | Shukair et al. |
| 9,451,383 | B2 | 9/2016 | Bulut et al. |
| 9,756,089 | B2 | 9/2017 | Brook et al. |
| 2004/0202117 | A1 | 10/2004 | Wilson et al. |
| 2005/0188098 | A1* | 8/2005 | Dunk ..................... H04L 67/14 709/232 |
| 2006/0123119 | A1 | 6/2006 | Hill et al. |
| 2006/0182141 | A1 | 8/2006 | Duggirala et al. |
| 2008/0039032 | A1 | 2/2008 | Haumont |
| 2010/0124211 | A1 | 5/2010 | Payyappilly et al. |
| 2011/0134936 | A1 | 6/2011 | Andreoli-Fang et al. |
| 2012/0135726 | A1 | 5/2012 | Luna et al. |
| 2013/0060815 | A1 | 3/2013 | Saeki |
| 2014/0068098 | A1 | 3/2014 | Anchan et al. |
| 2014/0301181 | A1 | 10/2014 | Suryavanshi et al. |
| 2016/0150041 | A1 | 5/2016 | Bolinger |

FOREIGN PATENT DOCUMENTS

| | | | |
|---|---|---|---|
| EP | 2871886 | B1 | 8/2016 |
| EP | 2725868 | B1 | 10/2017 |
| JP | 2013207495 | A | 10/2013 |
| WO | WO2006136661 | A1 | 12/2006 |
| WO | WO2012061430 | A3 | 5/2012 |
| WO | WO2012150473 | A1 | 11/2012 |
| WO | WO2013124541 | A1 | 8/2013 |
| WO | WO2014070728 | A8 | 5/2014 |

OTHER PUBLICATIONS

USPTO, Final Office Action in U.S. Appl. No. 15/661,734 dated Apr. 30, 2018.

USPTO, Final Office Action in U.S. Appl. No. 15/787,376 dated Sep. 21, 2018.

\* cited by examiner

DYNAMIC ADJUSTMENT OF KEEP-ALIVE MESSAGES FOR EFFICIENT BATTERY USAGE IN A MOBILE NETWORK

CROSS REFERENCE TO RELATED APPLICATIONS

This application is a continuation application of U.S. patent application Ser. No. 15/883,436 entitled "DYNAMIC ADJUSTMENT OF KEEP-ALIVE MESSAGES FOR EFFICIENT BATTERY USAGE IN A MOBILE NETWORK", which was filed on Jan. 30, 2018, being issued as U.S. Pat. No. 10,045,393 on Aug. 7, 2018, which was a continuation application of U.S. patent application Ser. No. 15/281,704 entitled "DYNAMIC ADJUSTMENT OF KEEP-ALIVE MESSAGES FOR EFFICIENT BATTERY USAGE IN A MOBILE NETWORK", which was filed on Sep. 30, 2016, being issued as U.S. Pat. No. 9,883,548 on Jan. 30, 2018, which is a continuation of U.S. patent application Ser. No. 15/079,089 entitled "DYNAMIC ADJUSTMENT OF KEEP-ALIVE MESSAGES FOR EFFICIENT BATTERY USAGE IN A MOBILE NETWORK", which was filed on Mar. 24, 2016, now U.S. Pat. No. 9,491,703 issued on Nov. 8, 2016, which is a continuation of U.S. patent application Ser. No. 14/662,161 "DYNAMIC ADJUSTMENT OF KEEP-ALIVE MESSAGES FOR EFFICIENT BATTERY USAGE IN A MOBILE NETWORK", which was filed on Mar. 18, 2015, now U.S. Pat. No. 9,485,732 issued on Nov. 1, 2016. U.S. patent application Ser. No. 14/662,161 is a continuation of U.S. patent application Ser. No. 14/283,193 entitled "DYNAMIC ADJUSTMENT OF KEEP-ALIVE MESSAGES INTERVALS FOR EFFICIENT BATTERY USAGE IN A MOBILE NETWORK", which was filed on May 20, 2014, now U.S. Pat. No. 9,007,976 issued on Apr. 14, 2015, which is a Continuation application of U.S. patent application Ser. No. 13/043,425 entitled "DYNAMIC ADJUSTMENT OF KEEP-ALIVE MESSAGES INTERVALS IN A MOBILE NETWORK", which was filed on Mar. 8, 2011, now U.S. Pat. No. 8,731,542 issued on May 20, 2014, which claims benefit of U.S. Provisional Patent Application No. 61/408,826 entitled "ONE WAY INTELLIGENT HEARTBEAT", which was filed on Nov. 1, 2010. U.S. patent application Ser. No. 14/662,161 claims the priority to U.S. patent application Ser. No. 12/853,119 entitled "MAINTAINING AN IP CONNECTION IN A MOBILE NETWORK", which was filed Aug. 9, 2010, now U.S. Pat. No. 8,285,200 issued on Oct. 9, 2012, which is a continuation of U.S. patent application Ser. No. 11/471,630, entitled "MAINTAINING AN IP CONNECTION IN A MOBILE NETWORK", which was filed Jun. 21, 2006, now U.S. Pat. No. 7,774,007 issued on Aug. 10, 2010, which claims benefit of U.S. Provisional Patent Application No. 60/707,170 entitled "MAINTAINING AN IP CONNECTION IN A MOBILE NETWORK", which was filed Aug. 11, 2005. The contents of each of these applications are incorporated by reference herein.

BACKGROUND

The invention relates to techniques for maintaining an IP (Internet protocol) connection in a mobile network.

In a packet-switched mobile network, a mobile terminal is not normally assigned a dedicated circuit-switched connection. Instead, the network establishes and maintains a session for the terminal, and data packets are sent when necessary. In order to integrate mobile terminals with office applications, it is becoming increasingly popular to maintain Internet Protocol (IP) connections over packet data channels in packet-switched mobile networks. Maintaining an IP connection to/from a mobile terminal is desirable in order to keep data banks synchronized between the mobile terminal and an office computer, for example.

Maintaining an IP connection in packet-switched mobile networks involves certain problems. For example, it consumes the mobile terminal's battery. Further, many networks apply operator-defined policies to break connections after a certain period of inactivity. This period can be quite short, such as five minutes. When the IP connection to/from the mobile terminal is disconnected, database synchronization is impossible before connection reestablishment. Connection re-establishment must be initiated from the mobile terminal's side, the network cannot initiate connection re-establishment.

But connection re-establishment involves further expenses in tariff and/or battery consumption. Yet further, since the network cannot initiate reestablishment of the IP connection, network-initiated data synchronization must be initiated by means of an out-band trigger, ie, signalling independent from the Internet Protocol. A short message service (SMS) and its derivatives are examples of theoretically suitable out-band triggering mechanisms. But a single GSM-compliant short message can only transfer approximately 160 characters, which means that it is impracticable to transfer actual data in the trigger message. This has the consequence that the subscriber must bear the expenses and delays in re-establishing the IP connection.

The mobile terminal can send keep-alive messages in order to prevent the network from disconnecting a temporarily inactive IP connection. A keep-alive message is a message sent for the purpose of preventing the network from disconnecting the IP connection.

The mobile terminal's operating parameters in respect of the keep-alive messages could be optimized for a single network, but connection break-up habits vary between networks and in a single network they may depend on roaming arrangements between operators.

SUMMARY

An object of the present invention is to provide a method, equipment and a computer program product to so as to alleviate the above disadvantages relating to connection break-up in packet-switched mobile radio networks. The object of the invention is achieved by the methods and equipment which are characterized by what is stated in the independent claims. The dependent claims relate to specific embodiments of the invention.

The invention is based on the following idea. An IP connection is established between the mobile terminal and its correspondent node. During periods of inactivity in the IP connection, keep-alive messages are sent at a predetermined schedule. Keep-alive messages can be quite short, such as 10 bytes, but they prevent the network from detecting the connection as inactive, whereby it is not disconnected. The keep-alive schedule is varied. At least one of the parties monitors the lengths of several periods of inactivity at which the mobile radio network disconnects the IP connection. Based on several monitored lengths of periods of inactivity, a maximum interval between keep-alive messages is determined such that the maximum interval meets some predetermined criterion of statistical confidence. In other words, spurious connection break-ups, which are not avoidable by keep-alive messages, are ignored. The interval between keep-alive messages is set to the determined maximum interval.

An aspect of the invention is a method according to claim 1. Other aspects of the invention relate to computer systems or program products for implementing the above methods.

BRIEF DESCRIPTION OF THE DRAWINGS

In the following the invention will be described in greater detail by means of specific embodiments with reference to the attached drawings, in which.

DETAILED DESCRIPTION

The invention is applicable to virtually any mobile network architecture. The mobile network may be based on GPRS, 1×RTT or EVDO technologies, for example. The invention can also be implemented as part of a push-type mobile e-mail system, particularly in a consumer e-mail system, in which optimization of network resources is important because of the large number of users.

Figure 1:
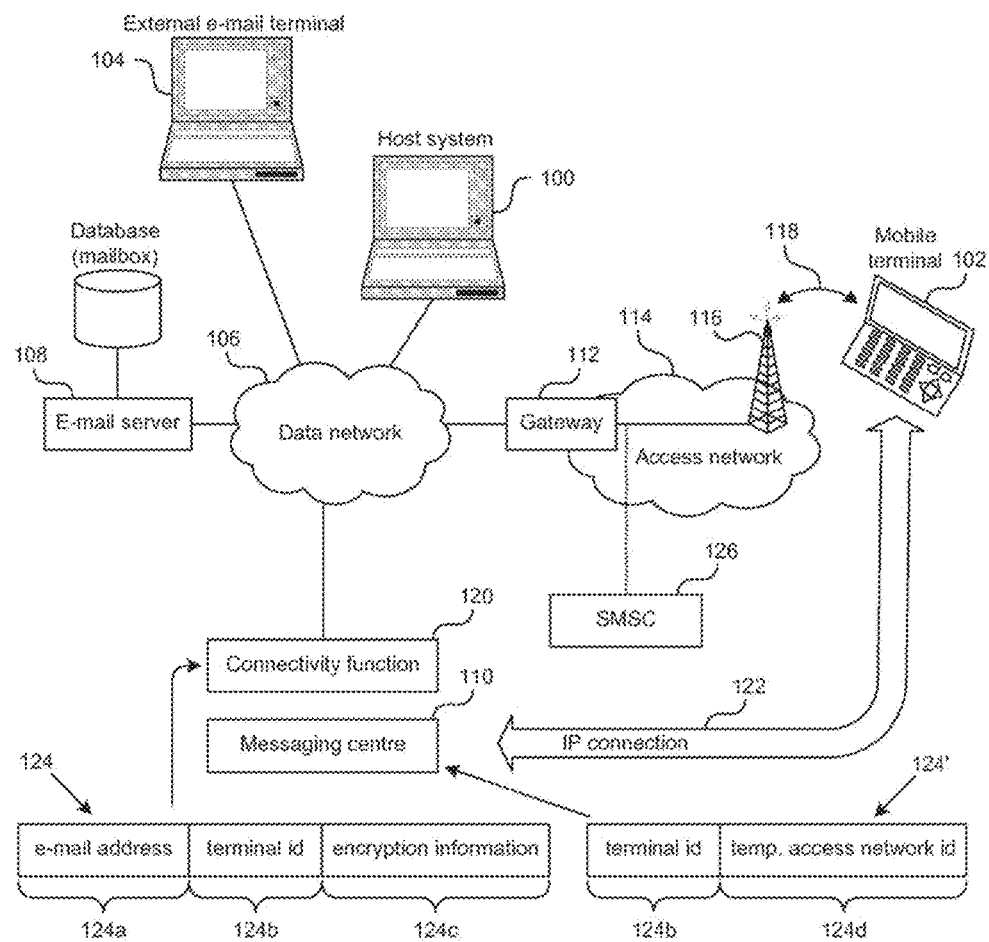
FIG. 1 shows an exemplary network arrangement in which the invention can be used.

FIG. 1 shows an exemplary system architecture which is supported by the owner of the present application. This system supports synchronization of e-mail messages and/or calendar items and/or other information between a host system and a mobile terminal.

Reference numeral 100 denotes a host system that is able to send an receive e-mail messages. Reference numeral 102 denotes a mobile terminal, also able to send an receive e-mail messages. The e-mail messages may originate or terminate at external e-mail terminals, one of which is denoted by reference numeral 104. The invention aims at improving cooperation between the host system 100 and mobile terminal 102 such that they can use a single e-mail account as transparently as possible. This means, for example, that the users of the external e-mail terminals 104, when sending or receiving e-mail, do not need to know if the user of the host system 100 actually uses the host system 100 or the mobile terminal 102 to communicate via e-mail. The transparency also means that e-mail manipulation at the mobile terminal 102 has, as far as possible, the same effect as the corresponding e-mail manipulation at the host system 100. For example, e-mail messages read at the mobile terminal 102 should preferably be marked as read at the host system.

Reference numeral 106 denotes a data network, such as an IP (Internet Protocol) network, which may be the common Internet or its closed subnetworks, commonly called intranets or extranets. Reference numeral 108 denotes an e-mail server and its associated database. There may be separate e-mail servers and/or server addresses for incoming and outgoing e-mail. The database stores an e-mail account, addressable by means of an e-mail address, that appears as a mailbox to the owner of the e-mail account. In order to communicate with mobile terminals 102, the data network 106 is connected, via a gateway 112 to an access network 114. The access network comprises a set of base stations 116 to provide wireless coverage over a wireless interface 118 to the mobile terminals 102.

Reference numeral 110 denotes a messaging centre that is largely responsible for providing the above-mentioned transparency between the host system 100 and the mobile terminal 102. The system architecture also comprises a connectivity function 120, whose task is to push e-mail messages to the mobile terminal. In the embodiment shown in FIG. 1, the connectivity function 120 is considered a physically integral but logically distinct element of the messaging centre 110.

The mobile terminal 102 may be a pocket or laptop computer with a radio interface, a smart cellular telephone, or the like. Depending on implementation, the host system 100, if present, may have different roles. In some implementations the host system 100 is optional and may be a conventional office computer that merely acts as the mobile terminal user's principal computer and e-mail terminal. In other implementations the host system may act as a platform for a single user's connectivity function, in addition to being an office computer. In yet other implementations the host system 100 may comprise the connectivity function for several users. Thus it is a server instead of a normal office computer.

We assume here that the access network 114 is able to establish and maintain a IP connection 122 between the messaging centre 110 and the mobile terminal 102.

FIG. 1 shows an embodiment in which the messaging centre 110 is largely responsible for e-mail transport to/from the mobile terminal 102 via the access network 114, while a separate connectivity function 120 is responsible for data security issues. The connectivity function 120 may be physically attached to or co-located with the messaging centre 110, but they are logically separate elements. Indeed, a definite advantage of the separate connectivity function 120 is that it can be detached from the messaging centre, for instance, within the company that owns the host system 100 or the e-mail server 108. For a small number of users, the connectivity function 120 can be installed in each host system 100, or the host system 100 can be interpreted as a separate server configured to support multiple users. It is even possible to implement some or all the above-mentioned options. This means, for example, that there is one or more messaging centres 110 that offer services to several network operators, or they may be a dedicated messaging centre for each network operator (somewhat analogous to short messaging centres). Each messaging centre 110 may have an integral connectivity function 120 to support users who don't wish to install a separate connectivity function in a host system 100. For users who do install a separate connectivity function 120 in their host systems 100, such connectivity functions bypass the connectivity function in the messaging centre 110 and address the messaging centre 110 directly.

A real e-mail system supports a large number of mobile terminals 102 and IP connections 122. In order to keep track of which e-mail account and which IP connection belongs to which mobile terminal, the messaging centre 110 and the connectivity function collectively maintain an association 124, 124' for each supported mobile terminal. Basically, each association 124, 124' joins three fields, namely an e-mail address 124a assigned to the mobile terminal or its user, encryption information 124c and a temporary wireless identity 124d of the mobile terminal in the access network. The embodiment shown in FIG. 1 also employs a terminal identifier 124b which may be the same as the e-mail address 124a of the mobile terminal 102, in which case the association 124 actually associates three information items. Alternatively, the terminal identifier 124b may be an identifier arbitrarily assigned to the mobile terminal. In a preferred implementation the terminal identifier 124b is the mobile terminal's equipment identifier or its derivative. The encryption information 124c is preferably related to the mobile terminal's equipment identity and is preferably generated by the mobile terminal itself, so as to ensure that no other terminal besides the one used for creating the encryption information 124c will be able to decrypt incoming encrypted e-mail messages. The temporary wireless identity 124d may be the identifier of the IP connection 122 to the mobile station.

In the above-described system, the messaging centre 110 and connectivity function 120 were arranged to support a fairly large number of users of e-mail and/or calendar data. In order to satisfy the needs of the present invention, virtually any communication server able to maintain an IP connection to the mobile terminal can be used.

Figure 2:
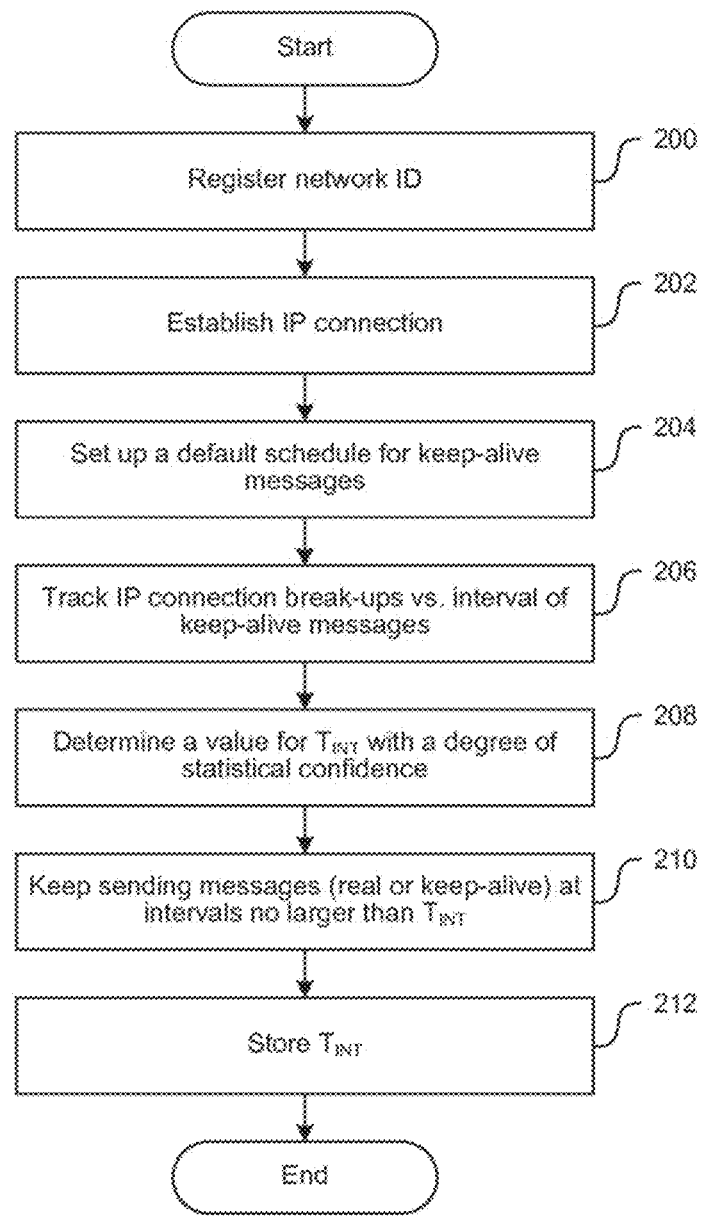
FIG. 2 shows a flowchart illustrating an embodiment of the invention.

FIG. 2 shows a flowchart illustrating an embodiment of the invention. In an optional step 200 the network identifier is registered, which means that the method steps should be performed and the resulting parameters maintained separately for each network. In step 202 an IP connection is established between the mobile terminal and its correspondent node. The connection establishment can be entirely conventional. Initially, in step 204, the mobile terminal and/or its correspondent node sends keep-alive messages when the IP connection is otherwise idle, ie, when there is no net user data to send. The keep-alive messages are sent according to a predetermined schedule. The schedule may be empty, which means that the mobile terminal may initially send no keep-alive messages at all. In step 206 the mobile terminal and/or its correspondent node keeps track of the periods of time after which the network disconnects the IP connection. The period of inactivity after which the network disconnects the IP connection will be called maximum inactivity period. A problem is that the mobile terminal does not know the true value of the maximum inactivity period; the network operator does not publish it. In an embodiment of the invention, the true value of the maximum inactivity period is approached from either direction (upwards and downwards) by altering the schedule for transmitting the keep-alive messages. On the other hand, it is not economically feasible to simply accept the shorted inactivity period before connection break-up as the value of the maximum inactivity period, because connection break-ups may occur for reasons which are not repeatable. In other words, many of the early connection break-ups occur regardless of the keep-alive messages, and attempting to eliminate such spurious break-ups by more frequent keep-alive messages will only result in increased battery drain and/or telecommunication tariffs.

Accordingly, step 208 comprises achieving a desired degree of statistical confidence in respect of the detected maximum inactivity period. In order to achieve statistical significance, the mobile terminal applies a confidence measure, such as variance. In a typical but non-restricting implementation, the mobile terminal may regard the connection break-up as regular if it happens after a certain inactivity period with a variance lower than some predetermined value. For example, the connection break-up may be considered regular if the network has discontinued the IP connection a predetermined minimum number x of times after an inactivity period of t, wherein the distribution of t has a variance var(t) which is smaller than some predetermined value y.

The act of achieving a desired degree of statistical confidence preferably comprises subtracting a safety margin $\Delta t$ from the detected maximum inactivity period. For example, the safety margin may be expressed in minutes, such as 1-2 minutes, or as a percentage, such as 10-20%. If the detected maximum inactivity period is, say, 15 minutes, the mobile terminal may store a value of 13-14 minutes as a maximum safe interval between keep-alive messages. Let us denote this interval value by TINT.

In step 210 the mobile terminal and/or its correspondent node set up a schedule for sending keep-alive messages at intervals no higher than TINT in absence of net user traffic. By sending keep-alive messages via an otherwise idle IP connection at intervals no higher than TINT, the network regards the IP connection as active and, under normal operating conditions, does not disconnect it.

The keep-alive messages can be sent by either end of the connection, ie, by the mobile terminal and/or its correspondent node, such as a server, in the fixed part of the mobile radio network.

Sending the keep-alive messages at intervals no higher than TINT can be accomplished by means of a timer, which may be a physical timer or a logical one, such as a program thread or process. Each time any message is sent (either a real message or a keep-alive message), a timer with a value TINT is triggered. When the timer expires, a keep-alive message is sent, and the timer is re-triggered.

The optimum value for the safety margin safety margin $\Delta t$ depends on the costs (battery-wise and tariff-wise) of sending keep-alive messages and reestablishing disconnected IP connections. It may also depend on the behaviour of the network, i.e., the regularity by which it breaks up temporarily inactive connections. If the network's behaviour is poorly predictable, and break-ups occurs with a certain safety margin, the safety margin should be increased.

In a further optional step 212, the maximum safe interval between keep-alive messages, TINT, is stored together with an identifier of the network in which the TINT was determined, whereby it can be quickly taken into use on re-entry to the same network. This value can be stored in the mobile terminal. Instead of storing the value in the mobile terminal, or in addition to it, the mobile terminal may send the value to its home network to be stored in a data base which can be inquired by mobile terminals which are about to begin roaming in a foreign network. The value stored by other mobile terminals in the data base in the home network may override any default value otherwise used by the roaming mobile terminal.

Instead of sending the keep-alive messages from the mobile terminal, or in addition to it, the keep-alive messages may be sent from a stationary server connected to the mobile radio network.

Figure 3A:
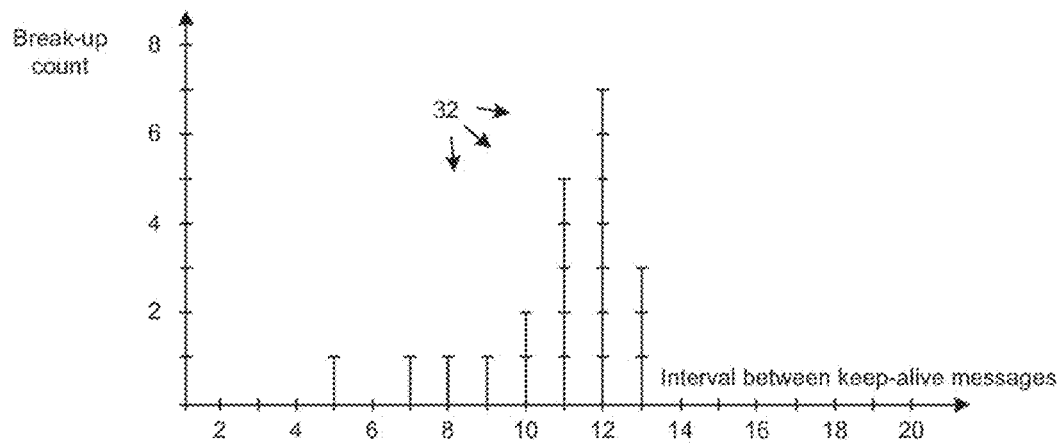
FIGS. 3A and 3B illustrate a technique for determining a maximum interval between keep-alive messages by means of a cumulative probability function.
Figure 3B:
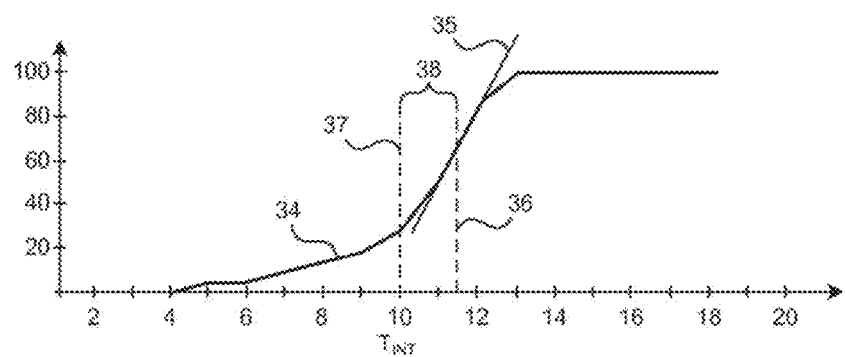

FIGS. 3A and 3B illustrate a technique for determining a maximum interval between keep-alive messages by means of a cumulative probability function. The vertical bars in FIG. 3A, collectively denoted by reference numeral 32, show counts of connection break-up versus interval between keep-alive messages. In this example, one break-up was detected at intervals of 5, 7, 8 and 9 minutes. Two break-ups were detected at an interval of 10 minutes, five at 11 minutes, seven at 12 minutes and, finally, three break-ups at an interval of 13 minutes. No idle connection survived for longer than 13 minutes.

Reference numeral 34 in FIG. 3B shows a cumulative probability function which illustrates a cumulative probability for the network breaking up an idle connection versus interval between keep-alive messages, given the monitoring data shown in FIG. 3A. As shown by function 34, all idle connection survived for 4 minutes and none survived for longer than 13 minutes. Reference numeral 35 denotes a line of maximum derivative in the cumulative probability function 34. It is reasonable to assume that the line of maximum derivative coincides with the maximum period of inactivity tolerated by the network. Or, if the cumulative probability function 34 is drawn as discrete steps (jumps), the position of line 35 can be determined by the highest jump in line 34.

This maximum period is denoted by reference numeral 36, and its value is approximately 11.5 minutes in this example. A value of 10 minutes for TINT is appropriate, as indicated by dashed line 37. Reference numeral 38 denotes a safety margin between the lines 36 and 37.

Although this example shows that as much as 30% of connections were disconnected after 10 minutes of inactivity, it is reasonable to assume that these disconnections were caused by spurious effects rather than the network's policy to break up idle connections.

It is readily apparent to a person skilled in the art that, as the technology advances, the inventive concept can be implemented in various ways. The invention and its embodiments are not limited to the examples described above but may vary within the scope of the claims.

We claim:

1. A method of maintaining an IP connection between a mobile terminal and a network node in a network, comprising:
    sending, by a first mobile terminal to a first network node, keep-alive messages in an absence of network traffic through the IP connection between the first mobile terminal and the first network node in a first network;
    monitoring the lengths of several periods of inactivity at which the first mobile network node disconnects the IP connection,
    wherein a maximum interval between keep-alive messages is determined based on the several monitored lengths of periods of inactivity such that the maximum interval meets a predetermined criterion of statistical confidence;
    storing the maximum determined interval in the first mobile terminal;
    providing the maximum determined interval to a second mobile terminal prior to the second mobile terminal connecting to a second network node in a second network,
    wherein the second mobile terminal sends keep-alive messages at the maximum determined interval.

2. The method of claim 1, wherein the first network is a home network for the first mobile terminal.

3. The method of claim 1, wherein the second network is a foreign network for the first mobile terminal.

4. The method of claim 1, wherein the second network is a foreign network for the second mobile terminal.

5. The method of claim 1, further comprising storing the maximum determined interval at the first mobile terminal and in association with an identifier of the first network.

6. The method of claim 1, wherein meeting a predetermined criterion of statistical confidence includes subtracting a safety margin from the detected maximum inactivity period.

7. The method of claim 6, wherein the safety margin is expressed in minutes.

8. The method of claim 6, wherein the safety margin is expressed as a percentage.

9. The method of claim 6, wherein the safety margin is proportional to the predictability of behavior of the first network.

10. The method of claim 6, wherein the safety margin corresponds to a cost associated with the first mobile terminal.

11. The method of claim 10, wherein the cost corresponds to battery life of the first mobile terminal.

12. The method of claim 10, wherein the cost corresponds to a tariff for sending keep-alive messages from the first mobile terminal.

13. A computer implemented method of operating a network comprising:
    determining, for a first mobile terminal, a keep-alive message interval, wherein the keep-alive message interval defines a maximum time interval between sending keep-alive messages between the first mobile terminal and a first network node over a first network in order to prevent disconnection of a first Internet Protocol connection between the first mobile terminal and the first network node;
    determining, for the first mobile terminal, a keep-alive message schedule for sending keep-alive messages over a period of time, wherein the keep-alive message schedule is based on the keep-alive message interval;
    storing the keep-alive message schedule in the first mobile terminal;
    providing, to a second mobile terminal, the keep-alive message schedule prior to the second mobile terminal connecting to a second network node over a second network,
    wherein the second mobile device sends keep-alive messages based on the keep-alive message schedule in order to maintain a second Internet Protocol connection between the second mobile terminal and the second network node.

14. A network-node device comprising:
    a communication interface operable to communicatively couple the network-node device to a network; and
    a processor and a memory storing program codes, coupled to the communication interface, operable to:
    determine, for a first mobile terminal, a keep-alive message interval, wherein the keep-alive message interval defines a maximum time interval between sending keep-alive messages between the first mobile terminal and a first network node over a first network in order to prevent disconnection of a first Internet Protocol connection between the first mobile terminal and the first network node;
    determine, for the first mobile terminal, a keep-alive message schedule for sending keep-alive messages over a period of time, wherein the keep-alive message schedule is based on the keep-alive message interval;
    store, in the first mobile terminal, the keep-alive message schedule; and
    provide, to a second mobile terminal, the keep-alive message schedule prior to the second mobile terminal connecting to a second network node over a second network,
    send, from the second mobile terminal, keep-alive messages based on the keep-alive message schedule in order to maintain a second Internet Protocol connection between the second mobile terminal and the second network node.

15. The network-node device of claim 14, the processor and memory further operable to:
    monitor periods of inactivity between the first mobile terminal and the first network node.

16. The network-node device of claim 15, the processor and memory further operable to:

detect a rate with which content requested from the second mobile terminal is changing; and dynamically adjust time intervals between sending the keep-alive messages based on the rate with which the content is changing and a cost to send the keep-alive messages in the network, wherein the cost includes re-establishing the second Internet Protocol connection in event of disconnection.

17. The network-node device of claim 14, the processor and memory further operable to:

determine a network identifier for the first mobile terminal; and associate keep-alive message schedule with the network identifier.

18. The network-node device of claim 16, wherein the cost corresponds to a battery life of the second mobile terminal.

19. The network-node device of claim 14, wherein the determined keep-alive message interval and keep-alive message schedule override default keep-alive message information.

20. The network-node device of claim 14, wherein:

the first mobile terminal is a first cellular phone, and the second mobile terminal is a second cellular phone.

\* \* \* \* \*